US010691796B1

(12) United States Patent
Stolte et al.

(10) Patent No.: US 10,691,796 B1
(45) Date of Patent: Jun. 23, 2020

(54) PRIORITIZING SECURITY RISKS FOR A COMPUTER SYSTEM BASED ON HISTORICAL EVENTS COLLECTED FROM THE COMPUTER SYSTEM ENVIRONMENT

(71) Applicant: CA, INC., San Jose, CA (US)

(72) Inventors: Ryan G. Stolte, New York, NY (US); Firas S. Rifai, San Francisco, CA (US); Humphrey Christian, Oakland, CA (US); Joseph Anthony DeRobertis, Altadena, CA (US); Shmuel Yehonatan Green, New York, NY (US)

(73) Assignee: CA, Inc., San Jose, CA (US)

( * ) Notice: Subject to any disclaimer, the term of this patent is extended or adjusted under 35 U.S.C. 154(b) by 190 days.

(21) Appl. No.: 15/836,796

(22) Filed: Dec. 8, 2017

Related U.S. Application Data

(60) Provisional application No. 62/505,087, filed on May 11, 2017, provisional application No. 62/505,091, filed on May 11, 2017, provisional application No. 62/505,096, filed on May 11, 2017, provisional application No. 62/505,099, filed on May 11, 2017.

(51) Int. Cl.
*H04L 29/06* (2006.01)
*G06F 21/55* (2013.01)

(52) U.S. Cl.
CPC .......... *G06F 21/554* (2013.01); *G06F 21/552* (2013.01); *G06F 2221/034* (2013.01)

(58) Field of Classification Search
CPC ................ G06F 21/552; G06F 21/554; G06F 2221/034; H04L 63/20; H04L 63/1416; H04L 63/1425; H04L 63/1433; H04L 63/1441
See application file for complete search history.

(56) References Cited

U.S. PATENT DOCUMENTS

| 6,907,531 | B1  | 6/2005  | Dodd et al. |
| 7,114,183 | B1* | 9/2006  | Joiner ................ H04L 43/045 713/188 |
| 7,293,287 | B2* | 11/2007 | Fischman .......... H04L 41/0213 709/223 |

(Continued)

OTHER PUBLICATIONS

Non-Published commonly Owned U.S. Appl. No. 15/836,785, filed Dec. 8, 2017, 58 pages, Bay Dynamics, Inc.

(Continued)

*Primary Examiner* — Hosuk Song
(74) *Attorney, Agent, or Firm* — FisherBroyles, LLP

(57) ABSTRACT

A method of identifying security risks in a computer system that includes several computers executing different applications is provided. The method receives event data about threat events associated with a set of applications executing on a set of computers in the computer system. The method, for each event, compares a set of parameters associated with the event with a set of historical parameters maintained for a similar event. The method, based on the comparisons, defines a normality characterization for each event to express a probability of an exploit of the application associated with the event. The method, based on the normality characterization, defines a prioritized display of security risks due to the threat events associated with the set of application.

20 Claims, 12 Drawing Sheets

(56) References Cited

U.S. PATENT DOCUMENTS

| | | | |
|---|---|---|---|
| 7,325,252 B2 * | 1/2008 | Bunker, V | H04L 43/00 726/23 |
| 7,665,119 B2 | 2/2010 | Bezilla et al. | |
| 7,698,148 B2 | 4/2010 | Lavu et al. | |
| 8,132,260 B1 | 3/2012 | Mayer et al. | |
| 8,495,747 B1 | 7/2013 | Nakawatase et al. | |
| 8,584,092 B2 | 11/2013 | Yawalkar et al. | |
| 8,595,845 B2 * | 11/2013 | Basavapatna | G06F 21/577 705/38 |
| 8,955,116 B2 | 2/2015 | Ikeda | |
| 9,100,428 B1 | 8/2015 | Visbal | |
| 9,411,965 B2 | 8/2016 | Giakouminakis et al. | |
| 9,479,357 B1 * | 10/2016 | Fu | H04L 51/38 |
| 2004/0083129 A1 | 4/2004 | Herz | |
| 2005/0044451 A1 | 2/2005 | Fry et al. | |
| 2006/0075503 A1 | 4/2006 | Bunker et al. | |
| 2007/0100744 A1 | 5/2007 | Wu et al. | |
| 2007/0156495 A1 | 7/2007 | King | |
| 2007/0157311 A1 | 7/2007 | Meier et al. | |
| 2007/0233787 A1 | 10/2007 | Pagan | |
| 2008/0294931 A1 | 11/2008 | Bantz et al. | |
| 2009/0260086 A1 | 10/2009 | Lang et al. | |
| 2010/0251215 A1 | 9/2010 | Yawalkar et al. | |
| 2011/0047114 A1 | 2/2011 | Marvell et al. | |
| 2011/0126111 A1 | 5/2011 | Gill et al. | |
| 2011/0178942 A1 | 7/2011 | Watters et al. | |
| 2012/0180133 A1 | 7/2012 | Al-Harbi et al. | |
| 2012/0254671 A1 | 10/2012 | Francisco et al. | |
| 2013/0247205 A1 | 9/2013 | Schrecker et al. | |
| 2013/0340084 A1 | 12/2013 | Schrecker et al. | |
| 2014/0165128 A1 | 6/2014 | Auvenshine et al. | |
| 2014/0237545 A1 | 8/2014 | Mylavarapu et al. | |
| 2014/0282820 A1 | 9/2014 | Walton et al. | |
| 2016/0012235 A1 | 1/2016 | Lee et al. | |
| 2016/0028758 A1 | 1/2016 | Ellis et al. | |
| 2016/0065621 A1 | 3/2016 | Bradley et al. | |
| 2016/0103992 A1 * | 4/2016 | Roundy | G06F 21/554 726/23 |
| 2016/0197953 A1 | 7/2016 | King-Wilson | |
| 2016/0294854 A1 | 10/2016 | Parthasarathi et al. | |
| 2016/0306965 A1 | 10/2016 | Iyer et al. | |
| 2017/0118237 A1 | 4/2017 | Reddy et al. | |
| 2017/0213037 A1 | 7/2017 | Toledano et al. | |
| 2017/0243009 A1 | 8/2017 | Sejpal et al. | |
| 2018/0121657 A1 | 5/2018 | Hay et al. | |
| 2018/0124094 A1 | 5/2018 | Hamdi | |
| 2018/0239903 A1 | 8/2018 | Bodin et al. | |
| 2018/0268313 A1 | 9/2018 | Baxter | |
| 2018/0276377 A1 | 9/2018 | Griffin et al. | |
| 2018/0324202 A1 | 11/2018 | Lim | |
| 2018/0337939 A1 | 11/2018 | Agarwal | |
| 2019/0052665 A1 | 2/2019 | Mahieu et al. | |

OTHER PUBLICATIONS

Non-Published commonly Owned U.S. Appl. No. 15/836,786, filed Dec. 8, 2017, 58 pages, Bay Dynamics, Inc.

Non-Published commonly Owned U.S. Appl. No. 15/836,787, filed Dec. 8, 2017, 58 pages, Bay Dynamics, Inc.

Non-Published commonly Owned U.S. Appl. No. 15/836,788, filed Dec. 8, 2017, 58 pages, Bay Dynamics, Inc.

Non-Published commonly Owned U.S. Appl. No. 15/836,789, filed Dec. 8, 2017, 58 pages, Bay Dynamics, Inc.

Non-Published commonly Owned U.S. Appl. No. 15/836,790, filed Dec. 8, 2017, 58 pages, Bay Dynamics, Inc.

Non-Published commonly Owned U.S. Appl. No. 15/836,791, filed Dec. 8, 2017, 76 pages, Bay Dynamics, Inc.

Non-Published commonly Owned U.S. Appl. No. 15/836,793, filed Dec. 8, 2017, 77 pages, Bay Dynamics, Inc.

Non-Published commonly Owned U.S. Appl. No. 15/836,794, filed Dec. 8, 2017, 78 pages, Bay Dynamics, Inc.

Non-Published commonly Owned U.S. Appl. No. 15/836,795, filed Dec. 8, 2017, 47 pages, Bay Dynamics, Inc.

Non-Published commonly Owned U.S. Appl. No. 15/836,797, filed Dec. 8, 2017, 37 pages, Bay Dynamics, Inc.

Weintraub, Eli, "Evaluating Confidentiality Impact in Security Risk Scoring Models," International Journal of Advanced Computer Science and Applications, Dec. 2016, 9 pages, vol. 7, No. 12, SAI Organization.

\* cited by examiner

PRIORITIZING SECURITY RISKS FOR A COMPUTER SYSTEM BASED ON HISTORICAL EVENTS COLLECTED FROM THE COMPUTER SYSTEM ENVIRONMENT

CLAIM OF BENEFIT TO PRIOR APPLICATIONS

This Application claims the benefit of U.S. Provisional Patent Application 62/505,087, filed May 11, 2017; U.S. Provisional Patent Application 62/505,091, filed May 11, 2017; U.S. Provisional Patent Application 62/505,096, filed May 11, 2017; and U.S. Provisional Patent Application 62/505,099, filed May 11, 2017. The contents of U.S. Provisional Patent Applications 62/505,087, 62/505,091, 62/505,096, and 62/505,099 are hereby incorporated by reference.

BACKGROUND

Cyber security experts consistently struggle to keep up with the overwhelming amount of data that is needed to identify threats and vulnerabilities, which when combined with the value of the assets that those threats and vulnerabilities are attached to, represent a security risk with the highest impact on the organization. In a large organization, many different tools and processes are used to provide cyber attack prevention and detection.

Each one of these tools and processes provide a different set of metrics and a different user interface. The metrics are provided based on a set of universal rules rather than what happens in the organization's actual environment. There is no single platform to analyze and correlate data from multiple diverse sources in an organization and provide a uniform interface to identify risks caused by user credential threats as well software and malware threats.

BRIEF SUMMARY

Some embodiments provide a method that identifies security risks in a computer system by performing a normality analysis of the security threat events. The method receives event data about threat events associated with a set of applications that execute in the computer system. The method compares different parameters associated with each event with a set of historical parameters that are maintained for similar events. Based on the comparisons, the method defines a normality characterization for each event in order to express a probability of occurrence associated with the event. The method then uses the normality characterization to identify and prioritize the security risks due to the threat events.

The event data in some embodiments is collected by directing a set of machine-executable processes to examine the operating environment of the applications while the applications are executing. Different processes such as security information and event management (SEIM), data loss prevention (DLP), and cloud access security brokers (CASB) are utilized to identify and collect event data. These processes collect data for authentication, access, and proxy events. The event data in some embodiments is stored and the stored data is then used to analyze and identify the security events. In other embodiments, event data is analyzed as the event data is collected while the applications are executing on the computer system.

The historical parameters associated with each event include parameters collected for events that occurred over the same period of time. For instance, the events can be grouped as events that occurred on the same day, in the same week, etc. The historical parameters associated with each event also include events that have occurred at the same source and/or at the same computer. The historical parameters associated with each event also include other events of the same type that occur in the computer system.

The method also performs normality characterization based on the protocol used by an event to access the Internet from the computer system or to access the computer system from the Internet. The method further performs normality characterization by comparing an event with a set of outbound events to access the Internet from the computer system or with a set of inbound events to access the computer system from the Internet. The method further performs normality characterization by analyzing user credential events that occur in the computer system.

The method in some embodiments performs machine learning by updating the historical parameters based on the set of parameters associated with each event. The method also defines and displays remedies to mitigate one or more security risks based on a prioritized display of security risks.

Some embodiments provide a method for identifying security risks in a computer system. The computer system includes several applications that execute on different computers. The method receives data about different events associated with one or more applications. The method analyzes the received event data and identifies credential threat and application threat security risks in the computer system. The method displays the identified risks that include both credential threat and application threat security risks.

The method identifies the credential threat events by analyzing credential events based on several different criteria. For instance, the method identifies credential threat events by analyzing the source and destination computers associated with each event. The method also identifies credential threat events based on the applications that are accessed or attempted to access in the source and destination computers of each event.

In order to facilitate analyzing credential threat events, the method uses different categories for the events. For instance, the method categorizes the credential threat events as local events, inbound events, or outbound events. The method also categorizes each credential threat event as an event initiated from an application to another application or an event initiated from an application to the same application.

The credential threat events are identified by comparing a set of parameters associated with each user-initiated event with historical parameters maintained for other events initiated by the same person. The historical parameters include the time of the day each particular type of event is initiated by the person or the type of events initiated by the same person. The credential threat events are also identified by comparing different parameters of each event initiated by a particular person with historical parameters maintained for events initiated by the peers of the particular person. Examples of the peers of a user include persons working in the same organizational unit such as the same group or the same department, persons managed by the same manager, and persons performing similar tasks in the organization. The credential threat events are further identified by determining whether an access requested by a person has received an authorization from a local computer or an inbound authorization from a standalone computer.

The method identifies credential threat security risks by weighting each credential threat event as an acceptable event, an attempt to exploit an application, or an unverified event. Once the credential threat security risks are identified, the method identifies remedies to limit access by one or more users to one or more applications based on the characterization of the credential threat events.

The method also identifies application threat events by analyzing applications associated with source and destination computers for each event. For instance, application threat security risks are identified based on the lack of one or more security measures to prevent an unauthorized exploit of the applications. The application threat events include application utilization events and application access events.

The method identifies application threat security risks by weighting each application threat event as either an acceptable event, an attempt to exploit an application, or an unverified event. The application threat security risks include application risks, web access risks, and computer hardware risks. Once the application threat potentials are identified, the method identifies a set of remedies to mitigate the unauthorized exploit of one or more applications.

The method also computes the residual risk of loss (or exposure value) in the computer system due to the identified security risks as a function of the risk due to threat of the exploit of all applications, the probability of the occurrence of the credential threat events, and the probability of the occurrence of application threat events.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for identifying security risks (or security vulnerabilities) in a computer system. The computer system includes several applications that execute on different computers. The method receives data about different events associated with one or more applications while the applications are executing in the computer system. The method identifies both credential threat security risks and application threat security risks based on the data collected from the computer system environment where the applications are executing.

Figure 1:
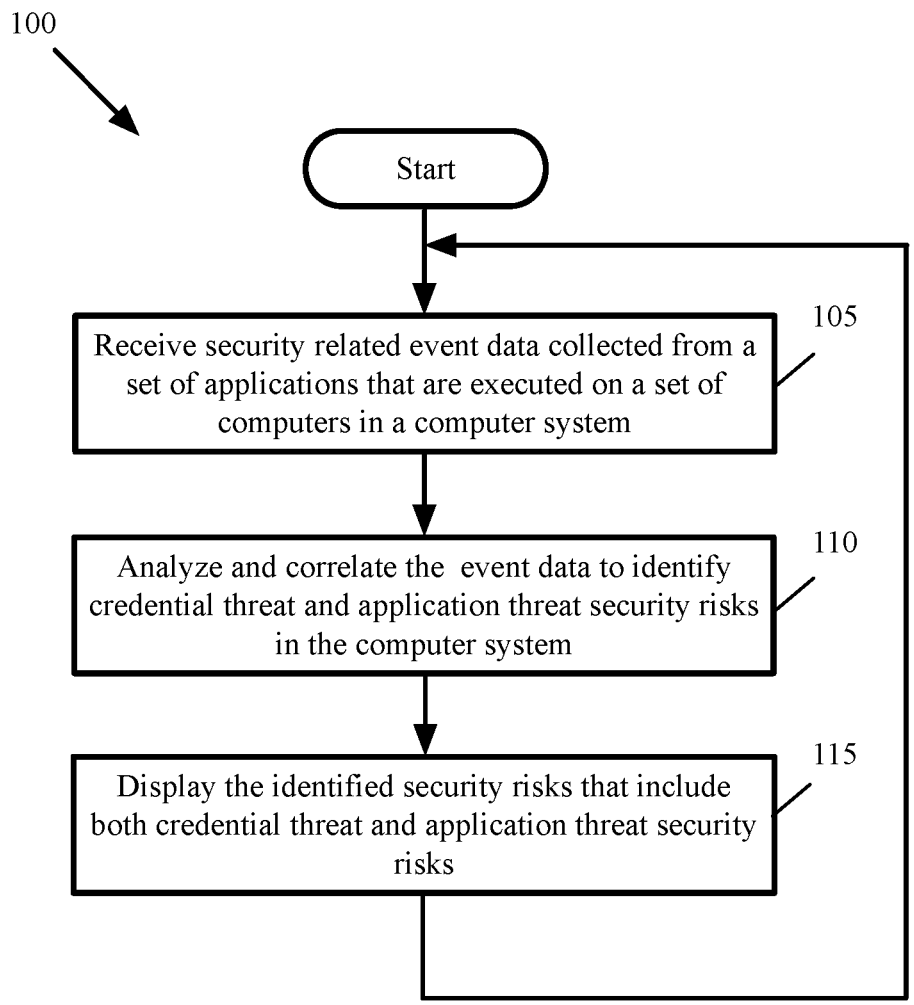
FIG. 1 conceptually illustrates a process for identifying security risks in a computer system in some embodiments.

FIG. 1 conceptually illustrates a process 100 for identifying security risks in a computer system in some embodiments. An example of a computer system is described below by reference to FIG. 11. Further aspects of identifying and mitigating security risks in a computer system are described in U.S. Patent Application 15/836,785, entitled "Identifying Security Risks Mitigations with the Largest Financial Impact for an Organization," concurrently filed with this application with; U.S. Patent Application 15/836,791, entitled "Monitoring and Managing Credential and Application Threat Mitigations in a Computer System," concurrently filed with this application with; and U.S. Patent Application 15/836,797, entitled "Quantifying the Financial Impact of Cyber Security Risks," concurrently filed with this application with. U.S. Patent Application 15/836,785 with; U.S. Patent Application 15/836,791 with; and U.S. Patent Application 15/836,797 with; are incorporated herein by reference.

As shown, process 100 receives (at 105) security related event data collected from a set of applications that are executed on a set of computers in a computer system. The process analyzes and correlates (at 110) the event data to identify credential threat and application threat security risks in the computer system. The process then displays (at 115) the identified security risks that include both credential threat security risks and application threat security risks. The process then proceeds to 105, which was described above.

The credential threats security risks are caused by unauthorized or unintended activities of users who are granted access to a portion of the organization's network and subsequently perform activities that intentionally or unintentionally compromise one or more applications. Examples of such activities include retrieval of data, modification of data, sending data to entities outside of the organization's network, performing financial transactions, unauthorized or unintended changing of the configuration of an application, etc.

Application threats security risks include risks due to threats that use flaws in the configuration of applications as well as flaws in the configuration of computer platforms that run the applications and the network equipment used to communicate with the applications. The flaws also include weaknesses or lack of protection mechanisms such as firewalls or antivirus for accessing the applications. Examples of configuration flaws include an out of date version of an application that is known to be prone to external attacks, an out of date operating system running on a computer that is used to execute an application, an unprotected ingress port of a computer where an application runs, a guest account with a default password on a user's computer, an out of date (or lack thereof) of encryption on outbound data, etc.

Figure 2:
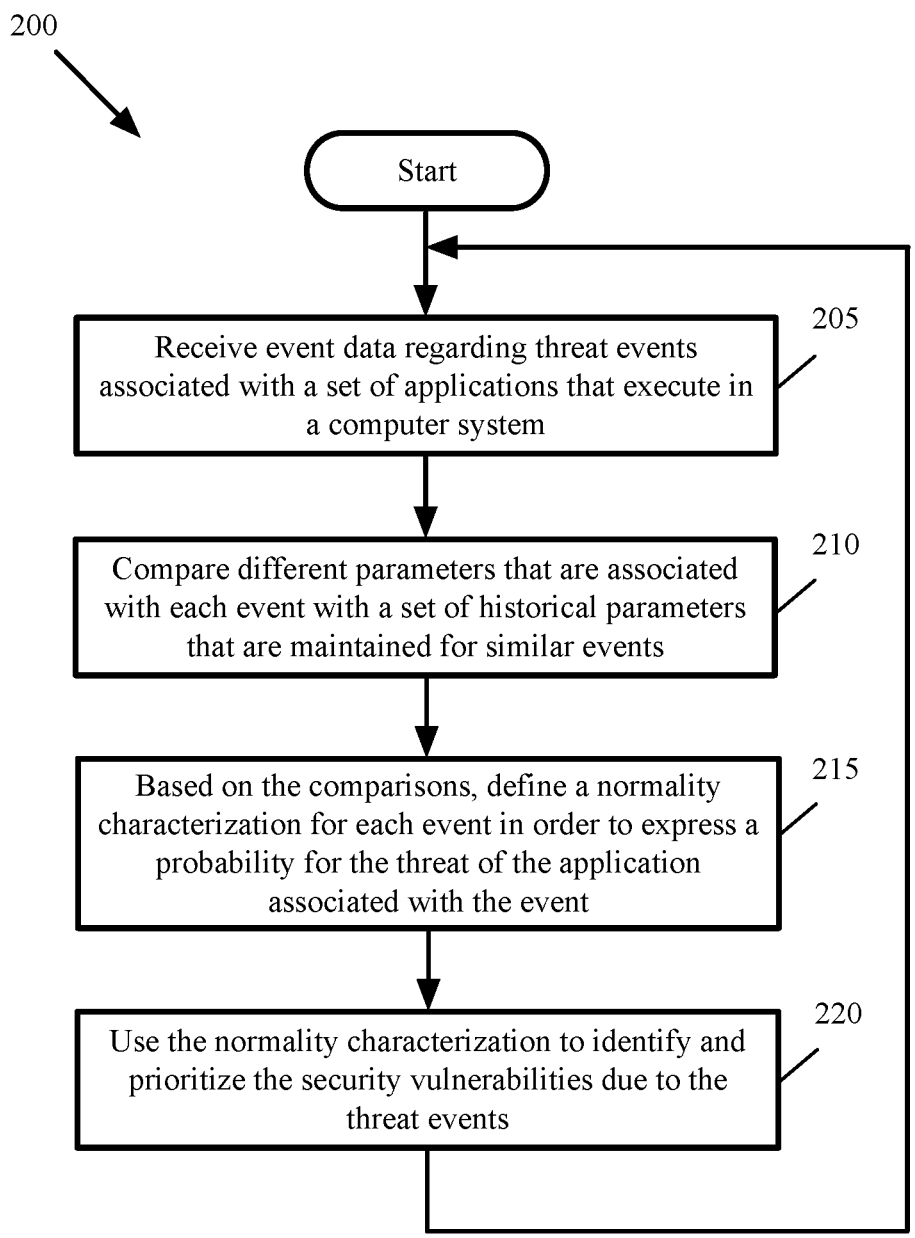
FIG. 2 conceptually illustrates a process for identifying security risks in a computer system by performing a normality analysis of the security threat events in some embodiments.

Some embodiments provide a method that identifies security risks in a computer system by performing a normality analysis of the security threat events. The computer system includes several applications that execute on different computers. FIG. 2 conceptually illustrates a process 200 for identifying security risks in a computer system by performing a normality analysis of the security threat events in some embodiments. As shown, the process receives (at 205) event data regarding threat events associated with a set of applications that execute in a computer system.

The process compares (at 210) different parameters that are associated with each event with a set of historical parameters that are maintained for similar events. Based on the comparisons, the process defines (at 215) a normality characterization for each event in order to express a probability of occurrence for the event.

The process uses (at 220) the normality characterization to identify and prioritize the security risks due to the threat events. The process then proceeds to 205, which was described above. Several more detailed embodiments of the invention are described in the sections below.

Some embodiments analyze event data that is collected from a computer system environment and identify credential threat potentials and application threat potentials. Some embodiments perform machine learning by comparing user behaviors and security related events with a set of historical parameters that are collected from the working environment of the computer system.

The user authentication requests and application access events are then categorized based on a normality analysis. User authentication requests and application access events that are out of norm are flagged as events with threat potential. The threat potentials are then ranked based on their financial impact on the organization. A prioritized set of remediations is then presented to mitigate the threat potentials.

Figure 3:
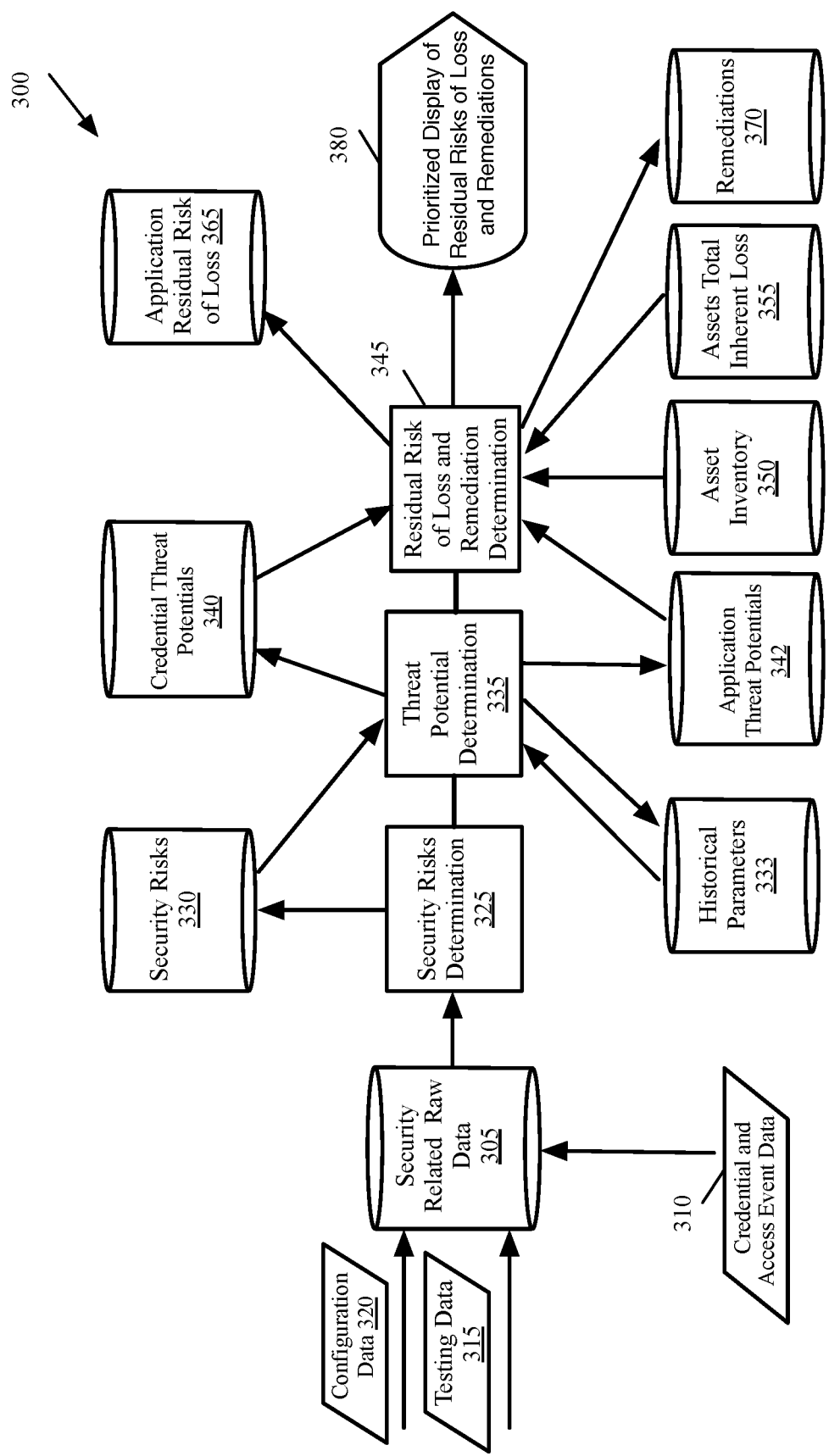
FIG. 3 conceptually illustrates a system for identifying credential and application threat potentials in some embodiments.

FIG. 3 conceptually illustrates a system 300 for identifying credential and application (or technical) threat potentials in some embodiments. As shown, the system includes a security risk determination subsystem 325, a threat potential determination subsystem 335, and a residual risk of loss and remediation determination subsystem 345. The system receives security related data and determines the credential and application threat potentials. The threat potentials are then used to determine the residual risk of loss (or the value at risk) for each application and provide prioritized remediations.

The system receives different metrics from the computer system by observing events that occur in the computer system environment. As shown, security related data 310-320 is collected from different sources in an organization's computer system and stored as raw data 305. The security related data includes credential and access event data 310, testing data 315, and configuration data 320. Examples of different systems and methods for collecting security related data are provided further below.

Credential and access event data 310 includes data collected for user authentication requests as well as automatic access requests (e.g., attempts to access a public website by an external software). Metrics such as identification of the user, whether a request is initiated from inside or outside of the computer system, the applications and the type of data accessed, the date and time of an authentication request, and whether data was transferred to a computer inside or outside the computer system are collected.

Testing data 315 includes data collected during different testing and audits that are performed by the organization in order to assess and prevent different cyber security risks. Configuration data 320 includes the event data regarding adding or removing security checkpoints for different applications, configuration data collected from log files, operating systems, network controllers, etc.

The collected metrics are correlated and analyzed by security risks determination subsystem 325 to identify security risks 330. Threat potential determination subsystem 335 determines credential threat potentials 340 and application threat potentials 342 based on a set of historical parameters 333 and the probability of occurrence of the security risks 330. The historical parameters are updated based on new credential and application threat potentials.

Residual risk of loss and remediations determination subsystem 345 uses the credential threat potentials 340, the application threat potentials 342, and other metrics such as the inventory of the assets in the computer system 350, and the assets total inherent loss 355 (i.e., the estimated maximum loss incurred for each asset if the asset were compromised) to determine the residual risk of loss (or exposure value) 365 for each application. Residual risk of loss and remediations determination subsystem 345 also provides a list of remediations 370 that are prioritized based on the reduction in the residual risk of loss should a remediation is implemented.

Each application in some embodiments is associated with a total inherent risk of loss and a residual risk of loss. The loss associated with the total inherent risk of an application is the estimated loss incurred by the organization if the application were compromised. The inherent risk of loss is, therefore, the overall risk for the total exposure of an application.

The residual risk of loss is the non-mitigated portion of the inherent risk of loss. The residual risk of loss of an application is the risk of loss of the application that can be eliminated by mitigating the risks that are identified for the application. The non-mitigated residual loss for each application in some embodiments is determined as a function of the risk due to the threat to the application and the probability of occurrence of the threat (or the exploit potential) determined by monitoring the application executing on the computers in the computer system.

Residual risk of loss and remediations determination subsystem 345 also displays (as shown by 380) a prioritized list of residual risks of loss and the associated remedies. For instance, the applications with higher residual risk of loss and the associated remedies are given more priorities since reducing or eliminating threat potential for these applications produces a higher financial impact for the organization.

Different components of the residual risk of loss determination system 300 are described in the following sections.

I. Identifying Security Risks

The security risks in some embodiments are determined based on the actual conditions in the computer system. For instance, data regarding different security related events and configurations are collected in the computer system. This data is collected by continuously monitoring the computer system environment in order to identify the potential for compromise in the system.

Figure 4:
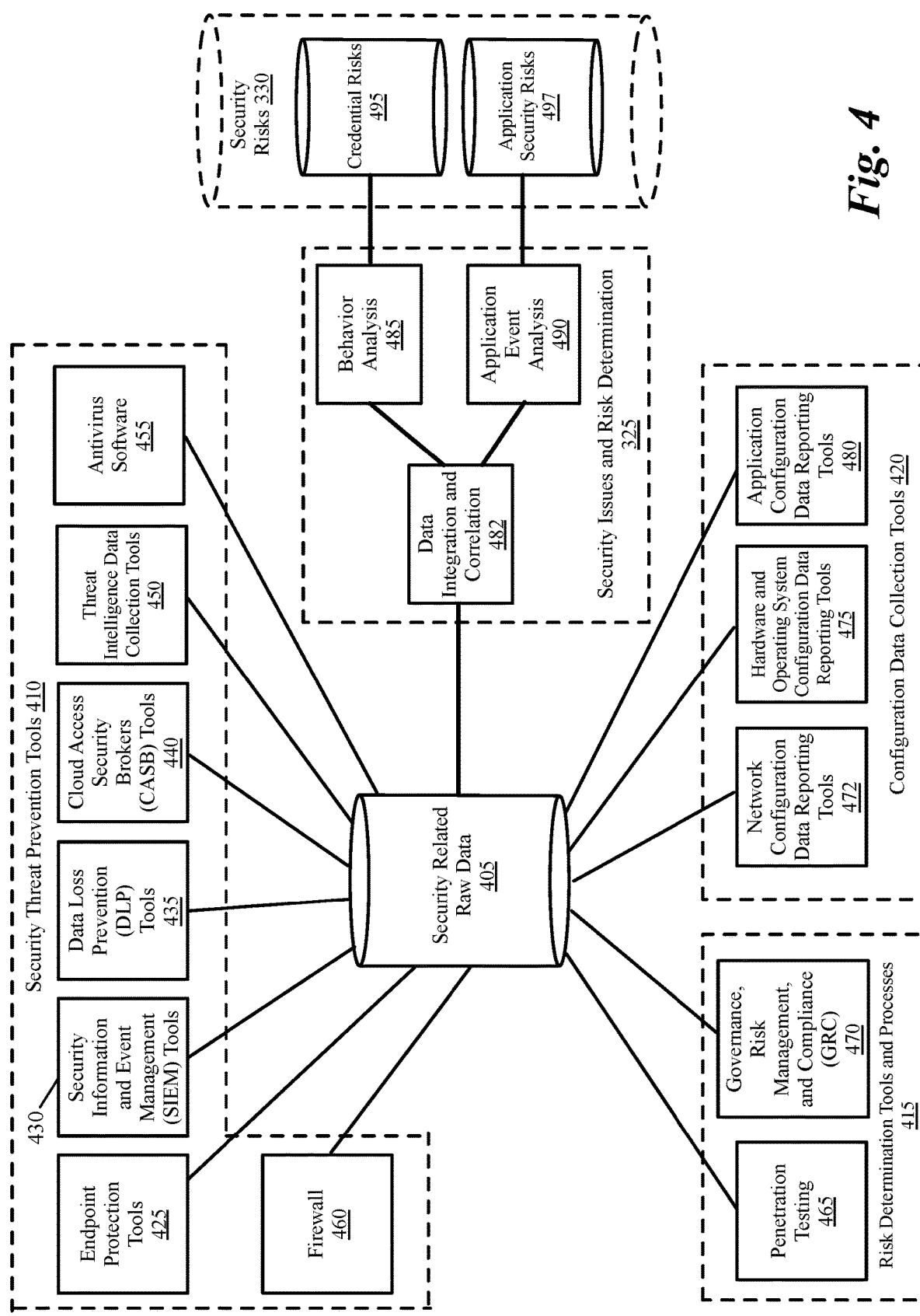
FIG. 4 conceptually illustrates a system that receives security related event data and determines threat potentials in some embodiments.

FIG. 4 conceptually illustrates a system that receives security related event data and determines threat potentials in some embodiments. Security related raw data 405 is collected from several different sources. Examples for the sources of security related raw data include security threat prevention tools 410, risk determination tools and processes 415, and configuration data collection tools 420. These tools and processes generate log files and reports that are retrieved and examined in order to determine the actual security issues and risks.

The security threat prevention tools 410 are used to collect authentication and access related data. Examples of security threat prevention tools include endpoint protection tools 425, security information and event management (SIEM) tools 430, data loss prevention (DLP) tools 435, cloud access security brokers (CASB) tools 440, threat intelligence data collection tools 450, antivirus software 455, and firewall 460.

Endpoint protection tools 425 are utilized to protect computer systems from possible threats by the devices that remotely access the computer system. STEM tools 430 are utilized to generate logs and reports for security compliance purposes. SIEM tools are also utilized for authentication and proxy data collection in order to collect data for direct authentication requests and authentication requests through proxies.

DLP tools 435 are used to prevent the users from sending sensitive data outside an organization's network. CASB tools 440 are utilized to provide security when an organization uses an outside cloud provider infrastructure.

Threat intelligence data collection tools 450 are used to collect data about possible cyber security threats. Antivirus software 455 is used to detect and remove computer viruses and malware. Firewalls 460 are used to control the incoming and outgoing packets in a computer network by enforcing a set of security rules.

Enterprises also utilize tools for determining risks in their computer system. Examples of these tools 415 include penetration testing (or pen testing) tools 465 and governance, risk management, and compliance (GRC) tools 470. Pen testing is the voluntary testing of a computer system to identify the weak points that may be exploited by attackers. Pen testing is done by attempting to attack the system through identified weak points both from outside and inside the system and reporting the results. Pen testing can be used both by automated software tools and/or manually. In either case, log files and reports are generated that can be retrieved and examined.

GRC refers to the processes and tools that an organization utilizes in order to meet the organization's objectives. An organization's management and board of directors establish and execute processes and procedures to adhere to the organization's goals. Risk management involves using tools and procedures to identify and manage risks. Compliance involves adhering to rules, regulations, and laws governing the organization's business as well as the internal policies and procedures established by the organization's management and board of directors.

Examples of configuration data collection tools 420 include network configuration data reporting tools 472, hardware and operating system configuration data reporting tools 475, and application configuration data reporting tools 480. Network configuration is typically done by configuration tools that provide a user interface for a network administrator to configure the network. These tools generate logs and provide tools for retrieving and examining the network configuration. Similarly, application vendors or operating systems provide tools to configure applications. These tools also generate logs and reporting tools provided by the vendors and/or operating systems, which subsequently allows retrieving and examining of the application configuration.

Tools and processes 425-480 collect data for authentication, access, and proxy events for different applications. The security related data in some embodiments is collected by directing a set of machine-executable processes to examine the operating environment of the applications while the applications are executing. In some embodiments, the event data is stored and the stored data 405 is then used by security risk determination subsystem 325 for analyzing and identifying the security risks 330. In other embodiments, security related data is analyzed and the security risks 330 are identified as the event data is collected while the applications are executing on the computer system.

As shown, security risk determination subsystem 325 includes several components: Data integration and correlation 482, behavior analysis 485, and application event analysis 490. Data integration and correlation component 482 consumes data from multiple sources 425-480 into a common data model. Instead of creating the replica of the source data (e.g., using the schema for a particular tool or process 425-480), data integration and correlation component 482 uses a schema of the common data model with all possible correlations of the security related data. Data from different sources 425-480 is then mapped into the common data model. The use of the common data model allows building the analysis logic into the common model independent of the sources of data. The common data model allows the data to be combined and correlated.

Figure 5:
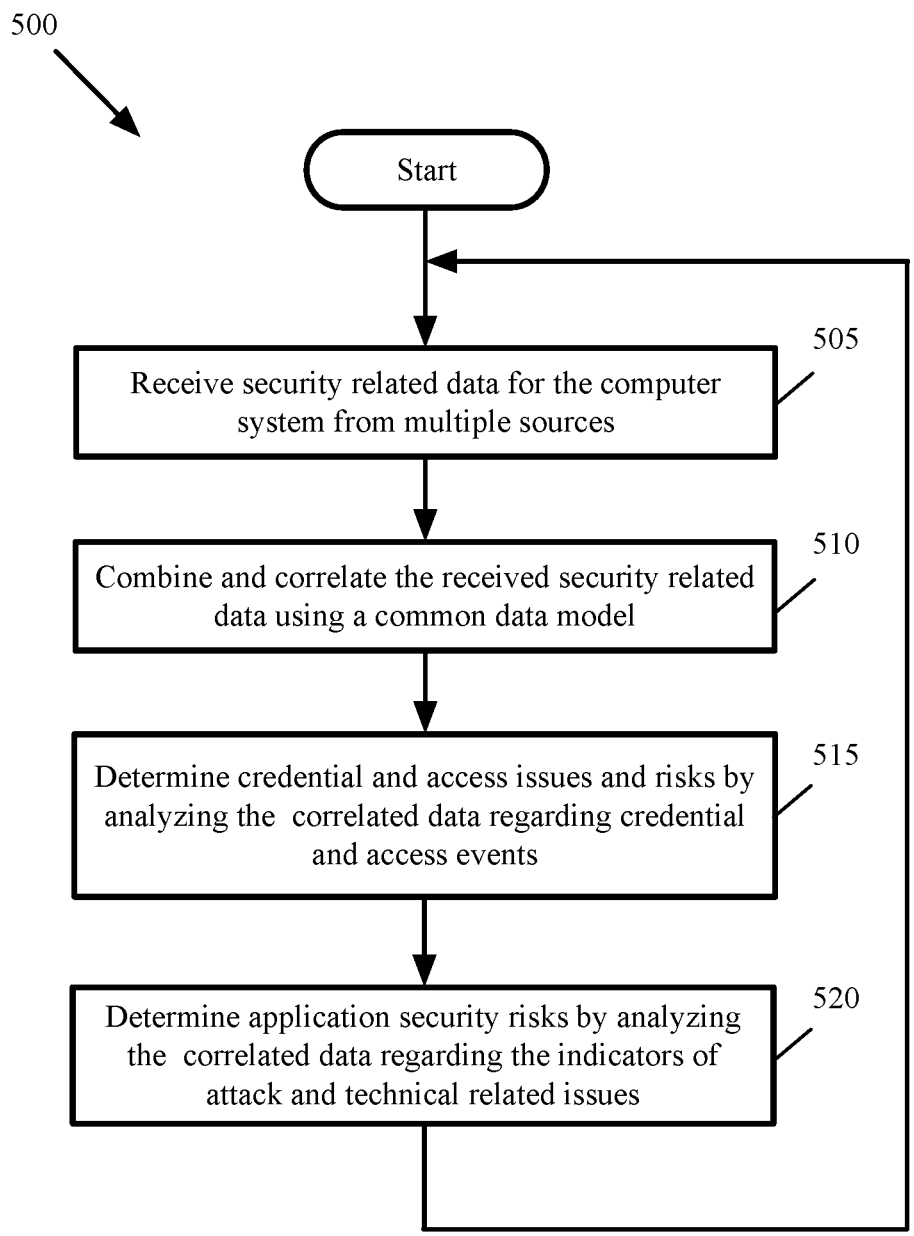
FIG. 5 conceptually illustrates a process for receiving security related event data and determining threat potentials in some embodiments.

FIG. 5 conceptually illustrates a process 500 for receiving security related event data and determining threat potentials in some embodiments. The process in some embodiments is performed by the security risk determination component 325 shown in FIGS. 3 and 4. As shown, the process receives (at 505) security related data for the computer system from multiple sources. For instance, the process receives security related raw data 405 from tools and processes 425-480 at security issues and risk determination component as shown in FIG. 4.

The process then combines and correlates (at 510) the received security related data using a common data model. For instance, the data integration and correlation component 482 in FIG. 4 maps the security related raw data 405 into a common model. The method then determines (at 515) credential and access risks by analyzing the correlated data regarding user authentication and access events. For instance, behavior analysis component 485 in FIG. 4 analyzes the correlated data regarding user authentication and access events and determines credential (or user authentication) issues and risks 495.

The method them determines (at 520) application security risks by analyzing the correlated data regarding the indicators of attack and application related issues. For instance, application event analysis component 490 in FIG. 4 analyzes the correlated data regarding the indicators of attack and configuration issues to identify application security issues and risks 497. The event data regarding application security issues and risks includes adding or removing security checkpoints for different applications, the configuration and the current version of the applications, the configuration of computers in the computer system, and collected indicators of attacks and compromise.

The method optionally stores credential risks, and the application security risks. For instance, the identified security issues and risks 330 in FIG. 4 are stored for further analysis. The method then proceeds to 505, which was described above. The method in some embodiments continuously updates the identified security risks.

II. Determining Credential and Application Threat Potentials by Normality Analysis In some embodiments, the threat potential of an application includes credential threat potential and application threat potential. The credential threat potential is caused by a user who is granted access to the organization's network and attempts to gain access to an application to perform intended or unintended activities that are not authorized for that user. Application threat are caused by flaws in the system that cause an application to be exploited by entities (persons or processes) that are not granted access to the organization's network or to the application.

A. Using Normality Analysis to Determine Security Threat Potentials

Some embodiments utilize a set of historical parameters for each type of event and perform a normality scoring to identify the threat potentials. The type of events includes credential events, web activities, data in motion (DIM) incidents, endpoint (EP) events, directory service user events, and directory service group events. The behavior of each event is analyzed and compared with similar behaviors that have previously occurred for an application, by a user, by a user's peers, etc.

Figure 6:
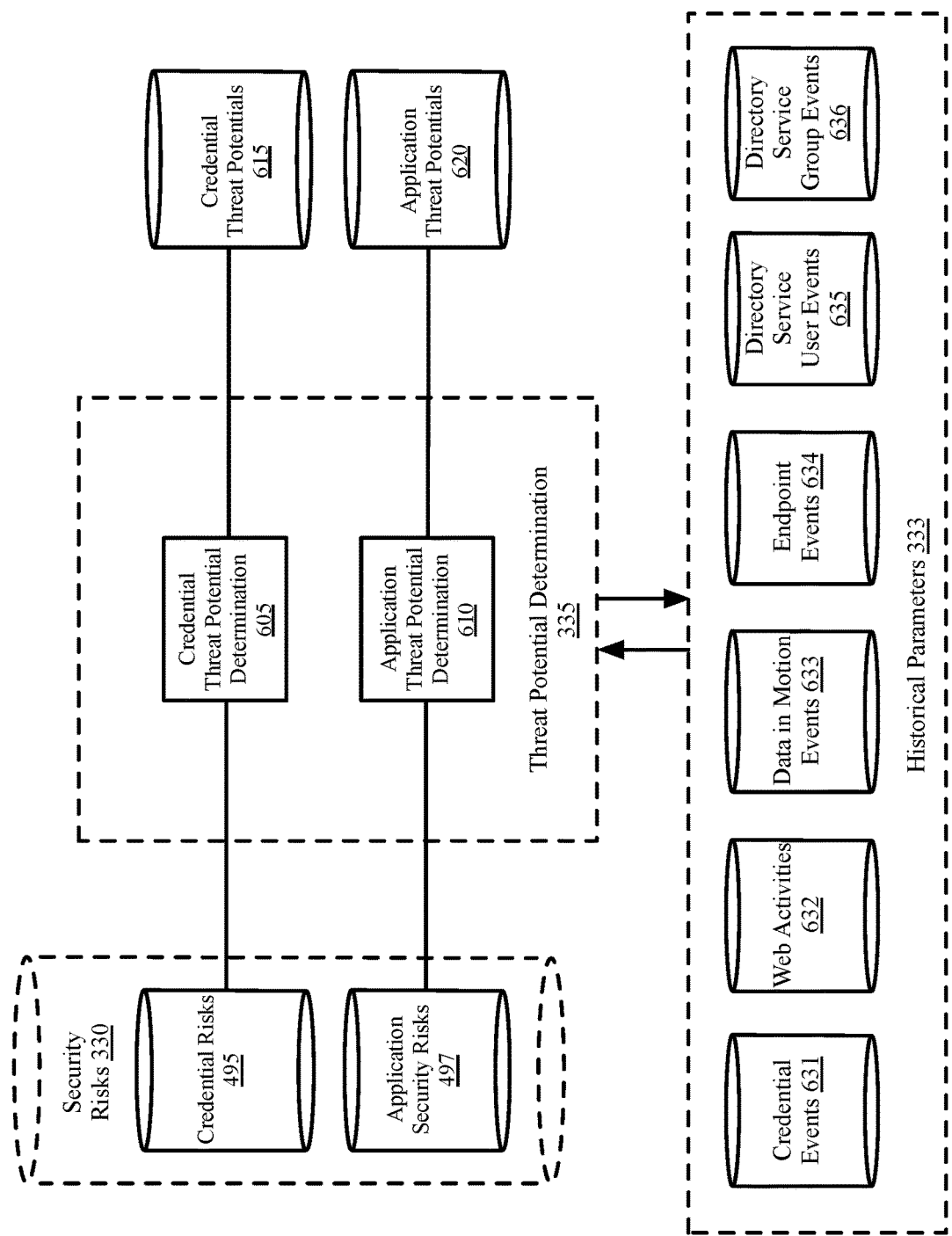
FIG. 6 conceptually illustrates a system for determining application threat potentials in a computer system in some embodiments.

FIG. 6 conceptually illustrates a system for determining application threat potentials in a computer system in some embodiments. The figure shows the threat potential determination component 335 of FIG. 3. As shown, the threat potential determination component includes a credential threat potential determination component 605 and an application threat potential determination component 610.

The credential threat potential determination and application threat potential determination components in some embodiments utilize a set of normality scores to determine the potential of the threats. The normality scores are determined by comparing the parameters of the events against historical parameters for similar events that have occurred in the computer system. As shown, the set of historical parameters 333 includes credential events 631, web activities 632, data in motion events 633, endpoint events 634, directory service user events 635, and directory service group events 636.

The historical parameters associated with each event include parameters collected for the events that occurred over the same period of time. For instance, the events can be grouped as events that occurred on the same day, in the same week, etc. The historical parameters associated with each event can also include events that have occurred at the same source, at the same computer, events of the same type that occur in the computer system, the protocol used by an event to access the Internet from the computer system or to access the computer system from the Internet, etc. Some embodiments perform machine learning by updating the historical parameters based on the set of parameters associated with each event.

1. Normality Analysis for Credential Events

Credential events are events that deal with a user's request to gain access to a computer and the associated application executing on the computer. Different parameters of a user credential event such as the time and day of the request, the computer or application for which access is requested, whether the request is initiated from inside or outside the organization, etc., are compared with parameters of historical credential events. A normality score is then defined for the credential event based on the comparison.

The historical credential events include authentication requests by the same user as well as authentication requests by peers of the user. Examples of the peers of a user include persons managed by the same manager, persons working for the same organizational unit such as a department, everybody in the organization, etc. The historical credential events are maintained for several periods such as previous year, previous quarter (last three months), previous month, previous week, previous day, etc. Some embodiments provide an administrator with a user interface to define one or more of the periods for which historical credential events are maintained. If any of these periods are not defined, a default period is used.

For each period of time, historical events are further maintained based on the source of the event (i.e., the computer or terminal from which the authentication request is initiated), based on the destination of the event (i.e., the computer or application to which the authentication request is requested), events of the same type (e.g., events with the same event code), etc.

Some embodiments update historical events on a sliding scale. For instance, yearly, quarterly, monthly, and weekly historical events are updated on a daily basis. The historical events for each category (e.g., same day events, same source events, same user events, etc.) are summed up. A raw normality count is then calculated as a function of the total number of events, and the number of events in each category. The raw normality score in some embodiments is further normalized (e.g., to a number between 1 and 100).

The parameters for each individual credential event are then compared with the number of occurrences of the corresponding historical parameters to define a normality score. Some embodiments map the normality scores into a set of discrete behavior types. For instance, some embodiments map the normality scores into (i) high volume failure, if the event count is greater than a threshold and the event failed, (ii) high volume normal, if the event count is higher than a threshold and the normality score is higher than a threshold, (iii) peer group unusual, if the difference between the normality score for different peer groups such as same manager group or same department group and the normality score for a user that initiated the credential event is more than a threshold, (iv) high variety unusual, when the count of a user's particular activity is greater than the count of the user's peers' particular activity by a threshold, etc. The events that do not fall into any discrete behavior type are categorized as neutral (or not notable).

2. Normality Analysis for Web Activities

Web activity (or web access) events are events initiated for accessing a website. For instance, a web activity can be an attempt to access one of the organization's websites. Different parameters of a web access event such as the time and day of the request, the protocol used to access the website, number of access attempts in a period, etc., are compared with the parameters of historical credential events. A normality score is then defined for the web access event based on the comparison.

The historical web access events include web access activities by the same user as well as authentication requests by peers of the user (e.g., persons managed by the same manager, persons working for the same organizational unit such as a department, everybody in the organization, etc.). The historical web access events are maintained for several periods such as previous year, previous quarter (last three months), previous month, previous week, previous day, etc. Some embodiments provide an administrator with a user interface to define one or more of the periods for which historical web access events are maintained. If any of these periods are not defined, a default period is used.

For each period of time, historical events are further maintained based on the protocol type and policy. Some embodiments update web access historical events on a sliding scale. For instance, yearly, quarterly, monthly, and weekly historical event are updated on a daily basis. The historical events for each category (e.g., same day events, same week events, same protocol events, same policy events, etc.) are summed up. A raw normality count is then calculated as a function of the total number of events, and the number of events in each category. The raw normality score in some embodiments is further normalized (e.g., to a number between 1 and 100). The parameters for each individual web access event are then compared with the number of occurrences of the corresponding historical parameters to define a normality score for the individual event.

Some embodiments calculate activity count, total hit count, minimum hit count, maximum hit count, and average hit count for each of the following entities: linked server type, user, NetBIOS (network basic input/output system) domain, manager NetBIOS domain, organization, category identification, protocol identification, week numbers in year, day number in week, and year. The hit counts are then grouped into hit bands, which are ranges for the number of hits (e.g., hit band 1 for number of hits between 0 and 3, hit band 2 for number of hits between 4 and, etc.)

A leak threshold is then calculated as a percentage of total activates for each of the entities for which the hit counts are collected. The total hit count is then normalized for each entity by setting the hit counts that exceed the leak threshold to 1. When the total hit count for an entity does not exceed the leak threshold, the normalized hit count is set to the total hit count.

A raw normality score is then calculated as a function of the total activities, same day activities, same week activities, same protocol activities, and same policy activities. The raw normality score is then normalized as follows: the normality score is set to 1 when the raw normality score is greater then or equal to 100, the normality score is set to 100 when the raw normality score less than or equal to 0, and the normality score is set to raw normality score the raw normality score is between 1 and 100.

3. Normality Analysis for Data in Motion (DIM) Events

DIM events relate to events that transfer data in an out of the organization's network. The data can be transferred by different means such as the Internet, intranet, email, etc. The DIM events may be associated with the transfer of data to update the content of different files and databases in the network.

Different parameters of a DIM event such as the time and day of the DIM incident, the user identification, domain identification, protocol identification, policy identification, etc., are compared with parameters of historical DIM events. A normality score is then defined for the DIM event based on the comparison.

The historical DIM events are maintained for several periods such as previous year, previous quarter (last three months), previous month, previous week, previous day, etc. Some embodiments provide an administrator with a user interface to define one or more of the periods for which historical DIM events are maintained. If any of these periods are not defined, a default period is used.

For each period of time, historical events are further maintained based on the protocol type and policy. Some embodiments update DIM historical events on a sliding scale. For instance, yearly, quarterly, monthly, weekly historical events are updated on daily basis. The historical events for each category (e.g., same day events, same week events, same protocol events, same policy events, etc.) are summed up. A raw normality count is then calculated as a function of the total number of events, and the number of events in each category. The raw normality score in some embodiments is further normalized (e.g., to a number between 1 and 100). The parameters for each individual DIM event are then compared with the number of occurrences of the corresponding historical parameters to define a normality score for the individual event.

Some embodiments calculate incident count, total match count, minimum match count, maximum match count, and average match count for each of the following entities: linked server type, user, NetBIOS domain, manager NetBIOS domain, organization, DIM policy identification, protocol identification, week numbers in year, day number in week, and year. The match counts are then grouped into match bands, which are ranges for the number of matches (e.g., match band 1 for number of matches between 0 and 3, match band 2 for number of matches between 4 and, etc.)

A leak threshold is then calculated as a percentage of total activates for each of the entities for which the match counts are collected. The total match count is then normalized for each entity by setting the match counts that exceed the leak threshold to 1. When the total match count for an entity does not exceed the leak threshold, the normalized match count is set to the total match count.

A raw normality score is then calculated as a function of the total incidents, same day incidents, same week incidents, same protocol incidents, and same policy incidents. The raw normality score is then normalized as follows: the normality score is set to 1 when the raw normality score is greater then or equal to 100, the normality score is set to 100 when the raw normality score less than or equal to 0, and the normality score is set to raw normality score the raw normality score is between 1 and 100.

4. Normality Analysis for Endpoint Events

Endpoint events are events associated with the source or destination of each security event. Endpoint events in some embodiments are categorized based on different factors such as linked server type, source user identification, source Internet protocol (IP) address, source network endpoint identification, source computer endpoint identification, destination user identification, destination IP address, destination network endpoint identification, destination computer endpoint identification, event description, action take, protection technology used for the particular protocol, time period (e.g., day, wee, year, etc.). The total event count of each category is then calculated.

A normality score is then calculated for the source user, destination user, source IP, destination IP, source computer endpoint, destination computer endpoint, source network endpoint, and destination network endpoint. A raw normality score is then calculated as a function of the total endpoint event, same period events (e.g., same day, same week, etc.), same protection technology event, same action taken, and same event description.

The raw normality score in some embodiments is further normalized (e.g., to a number between 1 and 100). The parameters for each individual endpoint event are then compared with the number of occurrences of the corresponding historical parameters to define a normality score for the individual event.

5. Normality Analysis for Directory Service User Events

A directory service, such as active Directory®, is a directory-based identity related service that is used to authenticate and authorize the users in a network domain. Directory service events in some embodiments are categorized based on different event codes, source user identification, manager identification, organization identification, time period (such as day, week, year), source computer endpoint identification, destination computer endpoint identification, etc.

The total event count of each category is then calculated. A normality score is then calculated for the same event codes, same time period (such as day, week, year), same destination computer endpoint identification, and same source computer endpoint identification.

The raw normality score in some embodiments is further normalized (e.g., to a number between 1 and 100). The parameters for each individual directory service user event are then compared with the number of occurrences of the corresponding historical parameters to define a normality score for the individual event.

Some embodiments calculate event count and total events for each day for each of the following entities: event code identification, destination computer endpoint identification, source user identification, management user identification, organization identification, week numbers in year, day number in week, and year.

A leak threshold is then calculated as a percentage of total count for each of the entities for which the counts are collected. The total event count is then normalized for each entity by setting the event counts that exceed the leak threshold to 1. When the total event count for an entity does not exceed the leak threshold, the normalized event count is set to the total event count.

A raw normality score is then calculated as a function of the total events, same day events, same week events, same destination events, same event codes, and same source events. The raw normality score is then normalized as follows: the normality score is set to 1 when the raw normality score is greater then or equal to 100, the normality score is set to 100 when the raw normality score less than or equal to 0, and the normality score is set to raw normality score the raw normality score is between 1 and 100.

6. Normality Analysis for Directory Service Group Events

Group directory service events in some embodiments are categorized based on different event codes, source user identification, directory service group identification, manager identification, organization identification, time period (such as day, week, year), source computer endpoint identification, destination computer endpoint identification, etc.

The total event count of each category is then calculated. A normality score is then calculated for the same event codes, same time period (such as day, week, year), same destination computer endpoint identification, and same source computer endpoint identification. Some embodiments maintain different counts for the events that are related to a directory service group membership and the events that are related to a change in a directory service group membership.

The raw normality score in some embodiments is further normalized (e.g., to a number between 1 and 100). The parameters for each individual directory service group event are then compared with the number of occurrences of the corresponding historical parameters to define a normality score for the individual event.

B. Determining Credential Threat Potential

The credential threats security risks are caused by unauthorized or unintended activities of users who are granted access to a portion of the organization's network and subsequently perform activities that intentionally or unintentionally compromise one or more applications. Examples of such activities include retrieval of data, modification of data, sending data to entities outside of the organization's network, performing financial transactions, unauthorized or unintended changing of the configuration of an application, etc.

Figure 7:
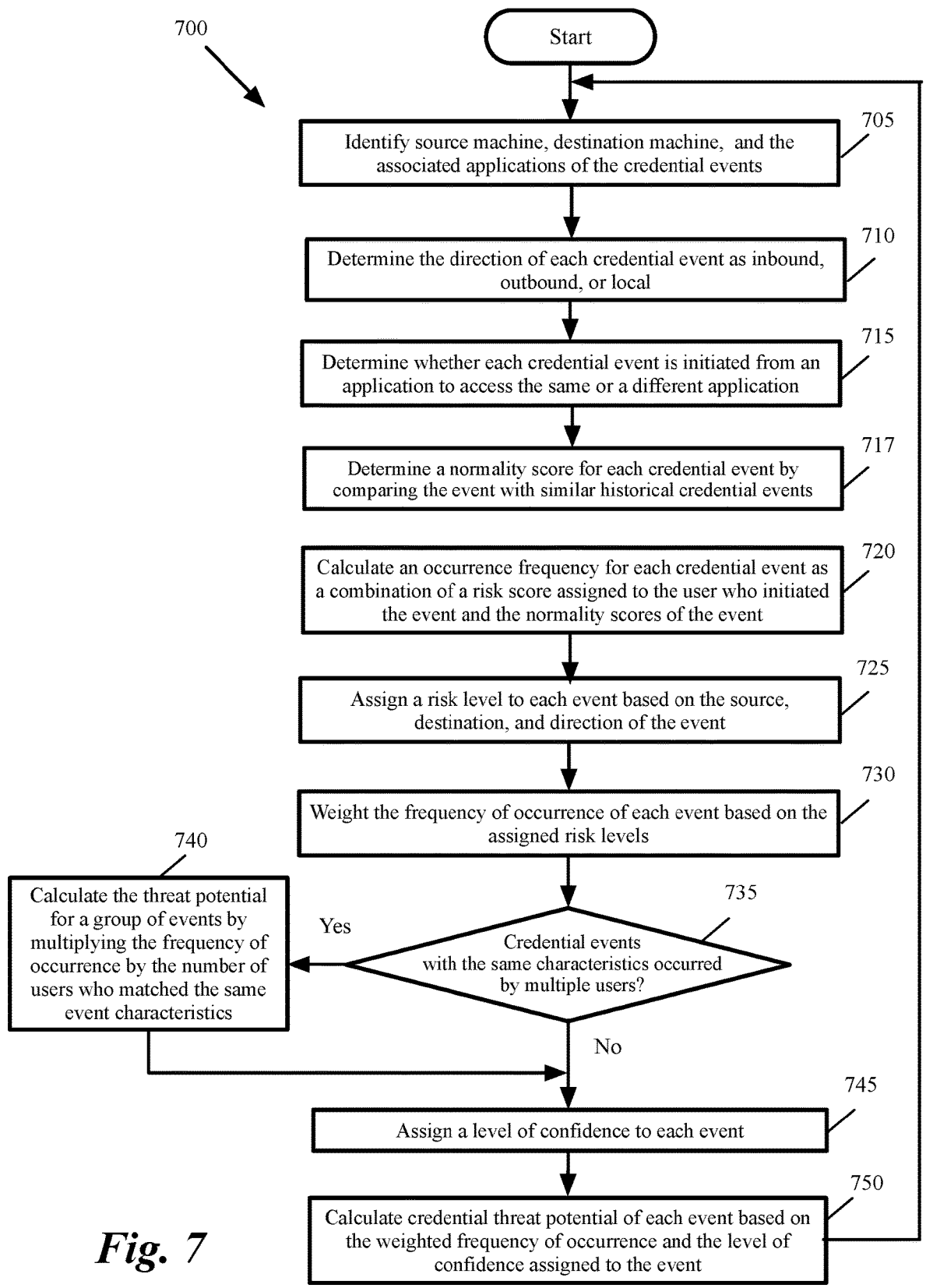
FIG. 7 conceptually illustrates a process for determining credential threat potentials using normality scores in some embodiments.

As shown in FIG. 6, credential threat potential determination component 605 receives credential risks 495 and determines credential threat potentials 615. FIG. 7 conceptually illustrates a process 700 for determining credential threat potentials using normality scores in some embodiments. The process in some embodiments is performed by the credential threat potential determination component 605 in FIG. 6.

As shown, the process identifies (at 705) the credential events' source and destination machines and the associated applications. The process then determines (at 710) the direction of each credential event as inbound, outbound, or local. The credential events are classified as local, inbound, or outbound. An inbound event is an event that is originated from a source outside the organization's network to a destination inside the organization's network. An outbound event is an event that is originated from a source inside the organization's network to a destination outside the organization's network. A local event is an event that is originated from a source inside the organization's network to a destination inside the organization's network.

The process further determines (at 715) whether each credential event is initiated from an application for accessing the same or a different application. The process then determines (at 717) a normality score for each credential event by comparing the event with similar historical credential events. As described above, normality scores for credential events are assigned to the occurrence of the event by the particular user who initiated the event, the occurrence of a similar event by any person in the same organizational unit (e.g., the same department, the same job title, the group managed by the same individual as the particular person) as the particular user, and the occurrence of a similar event by any person in the organization.

The process then calculates (at 720) an occurrence frequency for each credential event by using a combination of a risk score assigned to the user who initiated the event and the normality score of the event. The process then assigns (at 725) a risk level to each credential event based on the source, destination, and direction (i.e., inbound, outbound, local of the event. For instance, local authentications are considered not very risky while the 'inbound authentications from a standalone computer' authentications are considered very risky.

The process then weights (at 730) the frequency of occurrence of each event based on the assigned risk levels for each categorization. Some embodiments assign a numerical weight to each categorization and then assign a combined weight to the credential event based on the source, destination, direction, and the source and destination applications.

The process then determines (at 735) whether credential events with similar characteristics have occurred by other users. If not, the process proceeds to 745, which is described below. Otherwise, the process calculates (at 740) the credential threat potential for a group of events by multiplying the threat frequency by the number of active users who matched the same event characteristics.

The process then assigns (at 745) a level of confidence to each event. The level of confidence in some embodiments include acceptable, violation, being investigated, and undetermined (or not reviewed). The events that are categorized as acceptable or violation receive higher confidence weights than the events under investigation. The undetermined events receive zero (or the smallest confidence weight). The process then calculates (at 750) the credential threat potentials of each event based on the weighted frequency of occurrence and the level of confidence assigned to the event. The process then proceeds to 705, which was described above.

C. Determining Application Threat Potential

Application threat security risks include security risks due to threats that use flaws in the configuration of applications as well as flaws in the configuration of computer platforms that run the applications and the network equipment used to communicate with the applications. The flaws also include weaknesses or lack of protection mechanisms such as firewalls or antivirus for accessing the applications. Examples of configuration flaws include an out of date version of an application that is known to be prone to external attacks, an out of date operating system running on a computer that is used to execute an application, an unprotected ingress port of a computer where an application runs, a guest account with a default password on a user's computer, an out of date (or lack thereof) encryption on outbound data, etc.

Figure 8:
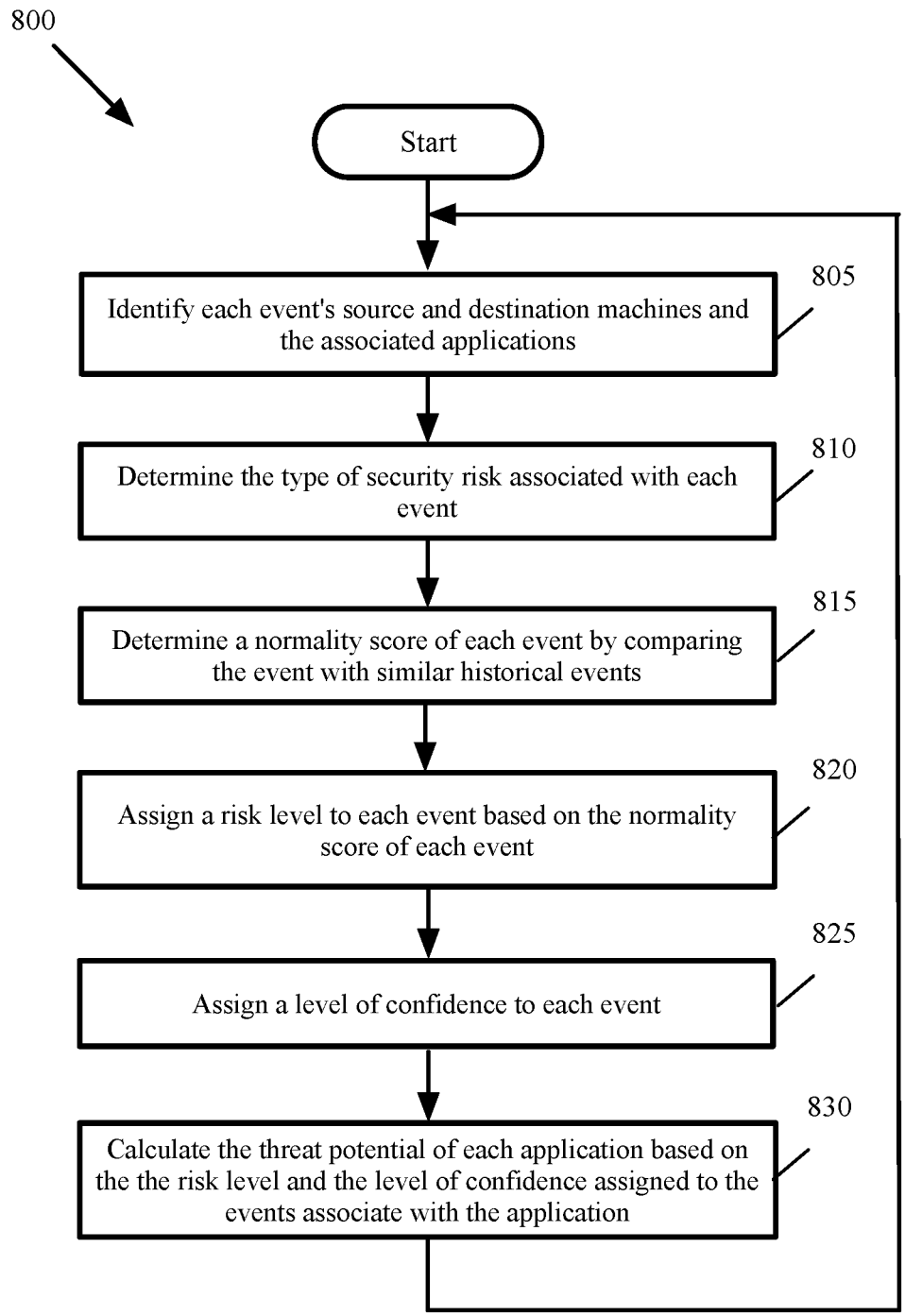
FIG. 8 conceptually illustrates a process for determining application threat potentials using normality scores in some embodiments.

As shown in FIG. 6, application threat potential determination component 610 receives application security risks 497 and determines application threat potentials 620. FIG. 8 conceptually illustrates a process 800 for determining application threat potential using normality scores in some embodiments. The process in some embodiments is performed by application threat potential determination component 610 in FIG. 6.

As shown, the process identifies (at 805) each event's source and destination machines and the applications executing on the source and destination machines. The process then determines (at 810) the type of security risk associated with each event. For instance, an event may indicate the removal of a firewall protection, addition of a patch to remove a risk, a configuration event that leaves an application or a machine on which an application runs vulnerable to cyber attacks. The process then determines (at 815) a normality score for each event by comparing the event with similar historical events.

The process then assigns (at 820) a risk level to each event based on the normality score of the event. For instance, application threat potential determination 610 in FIG. 6 determines a normality score for the event by determining the type of event (e.g., web activities, DIM incident, endpoint event, directory service user event, directory service group event, etc.) and sets the normality score for the event by comparing different parameters of the event with the historical events of the same type.

The process then assigns (at 825) a level of confidence to each event that is identified as a possible application threat event. The level of confidence includes acceptable, violation, investigated, and undetermined (or not reviewed). The events that are categorized as acceptable or violation receive higher confidence weights than the events under investigation. The undetermined events receive zero (or the smallest confidence weight). The process then calculates (at 830) the threat potential of each application based on the risk level and the level of confidence assigned to the events associated with the application. The process then proceeds to 805, which was described above.

III. Determining the Residual Risk of Loss for Applications

Figure 9:
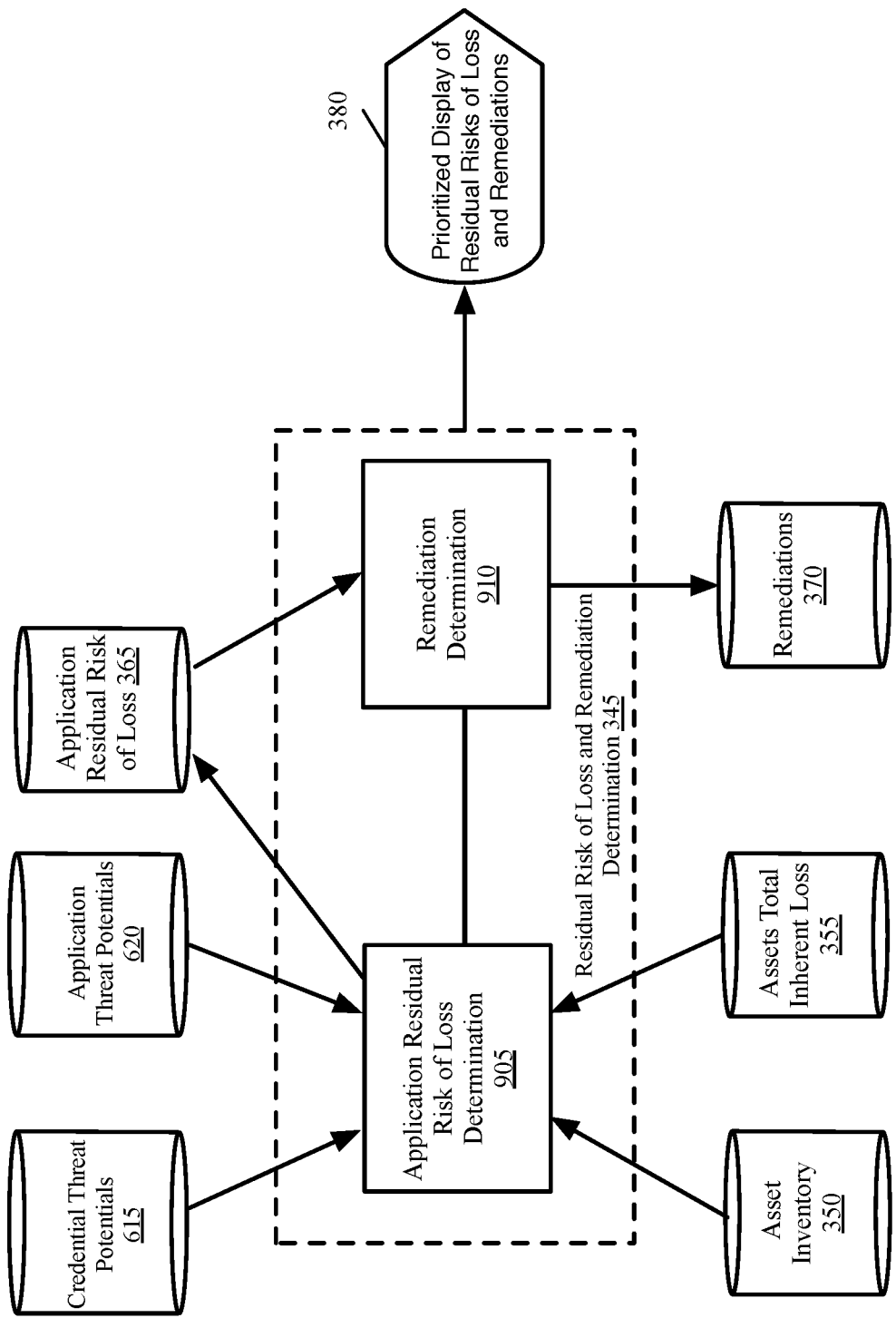
FIG. 9 conceptually illustrates a system for determining the residual risk of loss for applications that execute in a computer system in some embodiments.

In order to determine the residual risk of loss, different metrics are collected from the computer system. FIG. 9 conceptually illustrates a system for determining the residual risk of loss for applications that execute in a computer system in some embodiments. As shown, the residual risk of loss and remediations determinations subsystem 345 includes an application residual risk of loss determination component 905 and a remediations determination component 910.

Figure 10:
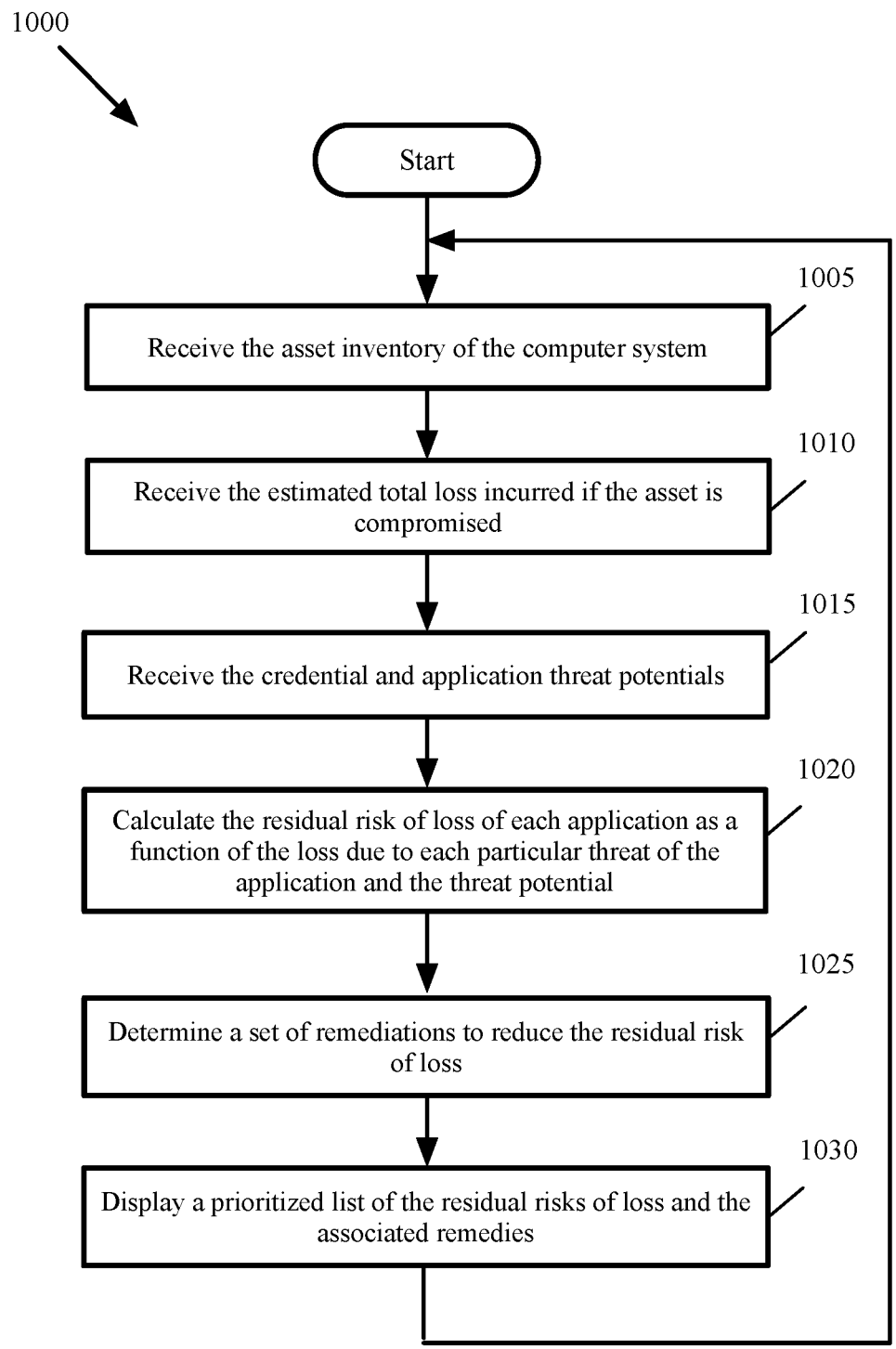
FIG. 10 conceptually illustrates a process for determining the residual risk of loss for applications that execute in a computer system in some embodiments.

FIG. 10 conceptually illustrates a process 1000 for determining the residual risk of loss for applications that execute in a computer system in some embodiments. The process in some embodiments is performed by the residual risk of loss and remediation determination subsystem 345 shown in FIG. 9.

As shown in FIG. 10, the process receives (at 1005) the asset inventory of the computer system. For instance, application residual risk of loss determination component 905 in FIG. 9 receives the asset inventory 350 of the computer system. The asset inventory includes the list of different applications that execute in the computer system.

The process also receives (at 1010) the estimated total (or inherent) risk incurred if the asset were compromised. For instance, application residual risk of loss determination component 905 receives the estimated total loss 355 of each application should the application be compromised. As an example, the compromise of an application that includes personal information may cause millions of dollars of damage for settlement of lawsuits, loss of reputation, loss of customers, etc.

In some embodiments, the estimated total (or inherent) risk of each application is received through a user interface that provides a discreet set of loss levels to assign to each application. In some embodiments, each loss level is tied to a monetary value (e.g., a value in dollars). The inherent risk of each application is then determined by mapping the level of loss associated with the application to the corresponding monetary loss value. In other embodiments, the loss levels are utilized as relative figures to identify the total loss caused by each application.

The process also receives (at 1015) the credential and application threat potentials. For instance, application residual risk of loss determination component 905 in FIG. 9 receives credential threat potentials 615 and application threat potentials 620. The process then calculates (at 1020) the residual risk of loss of each application as a function of loss due to each particular threat of the application and the potential of the threat. As described above by reference to process 700, the credential and application threat potentials are calculated based on different criteria used to determine the probability of occurrence of a particular threat. The residual risk of loss in some embodiments is determined as a monetary value (e.g., a value in dollars). In other embodiments, the residual risk of loss is defined as a normalized risk factor.

The process then determines (at 1025) remediations to reduce the residual risk of loss. For instance, remediation determination component 910 in FIG. 9 receives the application residual risk of loss 365 and determines a set of remediation to reduce one or more residual risk of loss.

The process then displays (at 1030) a prioritized list of residual risks of loss and the associated remedies. For instance, the process uses the application residual risk of loss 365 and gives more priority to reducing or eliminating threat potential with higher residual risk of loss. As shown in FIG. 9, residual risk of loss and remediation determination subsystem 345 displays (as shown by 380) a prioritized display of residual risks of loss and the associated remedies. The process then proceeds to 1005, which was described above.

IV. Computer and Electronic System

A. Computer System

Figure 11:
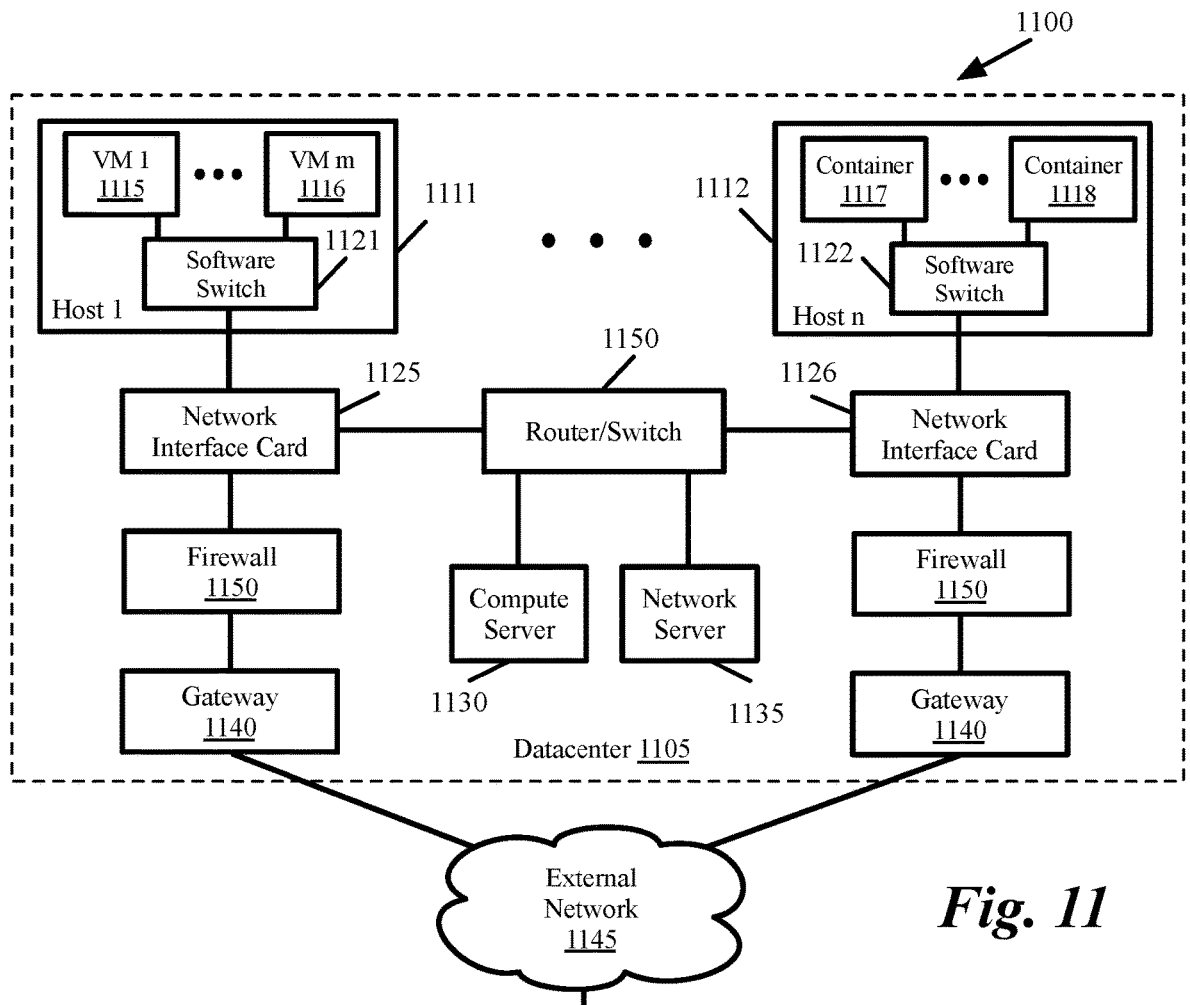
FIG. 11 conceptually illustrates an example of a computer system for which the security risks are identified and mitigated in some embodiments of the invention.
Figure 11:
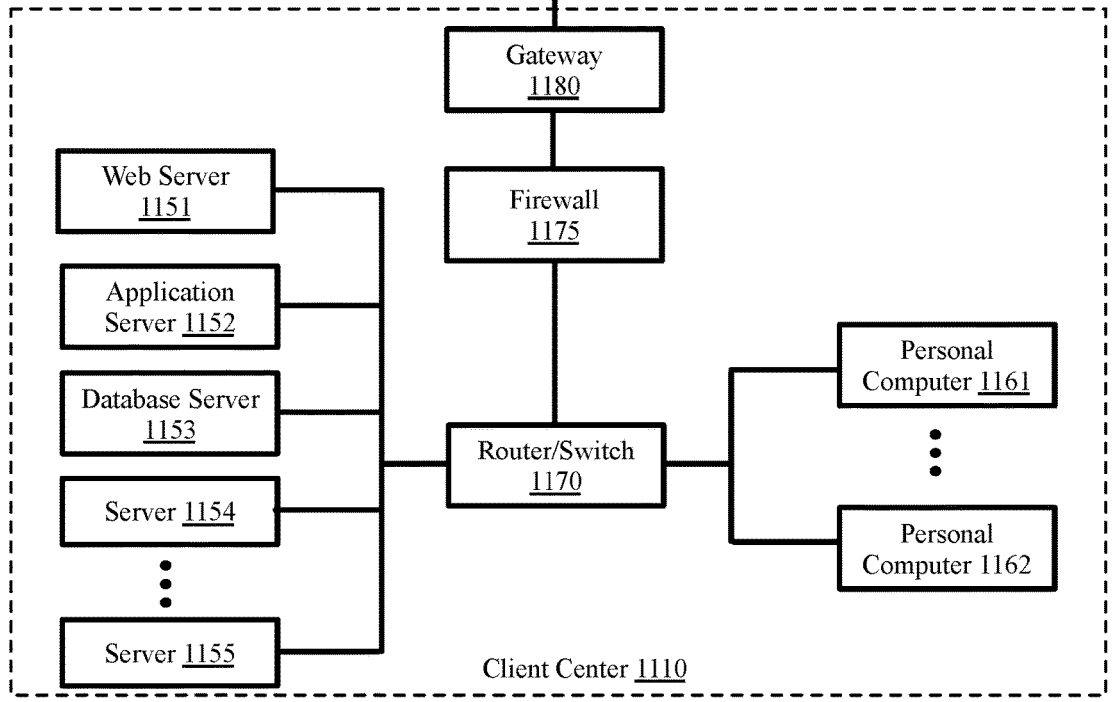

FIG. 11 conceptually illustrates an example of a computer system 1100 for which the security risks are identified and mitigated in some embodiments of the invention. Some of the computers, servers, and storage, used by the organization may be located in a datacenter such as datacenter 1105 while other computers, servers, and storage used by the organization may be in one or more client centers 1110 located in different campuses, buildings, or departments.

Datacenters include private datacenters that are managed by the organization that uses the datacenter and third party provided datacenters (such as datacenters built by cloud service providers) that may be used by many different clients that are unknown to each other. A datacenter centralizes an organization's information technology operations, computing equipment, data storage, etc.

In the example of FIG. 11, datacenter 1105 provides several servers 1111-1112. Some of these servers act as a host for one or more data compute nodes (DCNs) 1115-1118. An example of a DCN is a virtual machine (VM) 1115-1116 that can operate with its own guest operating system on a host by using resources of the host that are virtualized by virtualization software (e.g., a hypervisor or a VM monitor) of the host. Another example of a DCN is a container 1117-1118 that runs on top of a host operating system without the need for a hypervisor or separate guest operating system.

Each DCN 1115-1118 is typically connected to a network interface card 1121-1122 through a software switch 1125-1126. The datacenter also includes a set of compute servers 1130 for managing the DCNs and a set of network servers 1135 for managing the computer network that connected different entities inside the datacenter. The datacenter also provides storage (not shown) for different servers and DCNs.

The networked entities in the datacenter are connected to each other through one or more networks such as local area networks (LANs) and overlay networks. An overlay network is a network virtualization technology that achieves multi-tenancy in a computing environment. The networked entities in the datacenter are connected to each other through one or more forwarding elements such as switches or routers 1150. The entities inside the datacenter are connected to an external network 1145 (such as the Internet) or a wide area network (WAN) through one or more gateways 1146-1147 through the firewall 1150.

The computers, servers, and storage used by the organization may also be in one or more client centers 1110. The client center may include servers 1151-1155 and personal computers 1161-1162. Examples of the servers include one or more web servers 1151, application servers 1152, and database servers 1153 (e.g., to implement a multi-tiered enterprise architecture).

The datacenter and client center servers may include one or more other servers. Such servers may provide one or more monitoring or security services. Examples of these services include security threat prevention tools 410, risk determination tools and processes 415, and configuration data collection tools 420 that were described above by reference to FIG. 4.

Security threat prevention tools may include one or more of endpoint protection tools 425, security information and event management (SEIM) tools 430, data loss prevention (DLP) tool 435, cloud access security brokers (CASB) tools 440, threat intelligence data collection tools 450, and anti-virus software 455 as shown in FIG. 4. Risk determination tools and processes may include one or more of prevention testing tools 465 and governance, risk management, and compliance (GRC) tools 470 as shown in FIG. 4. Configuration data collection tools may include one or more of network configuration data reporting tools 472, hardware and operating system configuration data reporting tools 475, and application configuration data reporting tools 480 as shown in FIG. 4. The computers 1161-1162 and servers 1151-1155 are connected to the external network 1145 through a set of routers and switches 1170, firewall 1175, and gateway 1180.

B. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
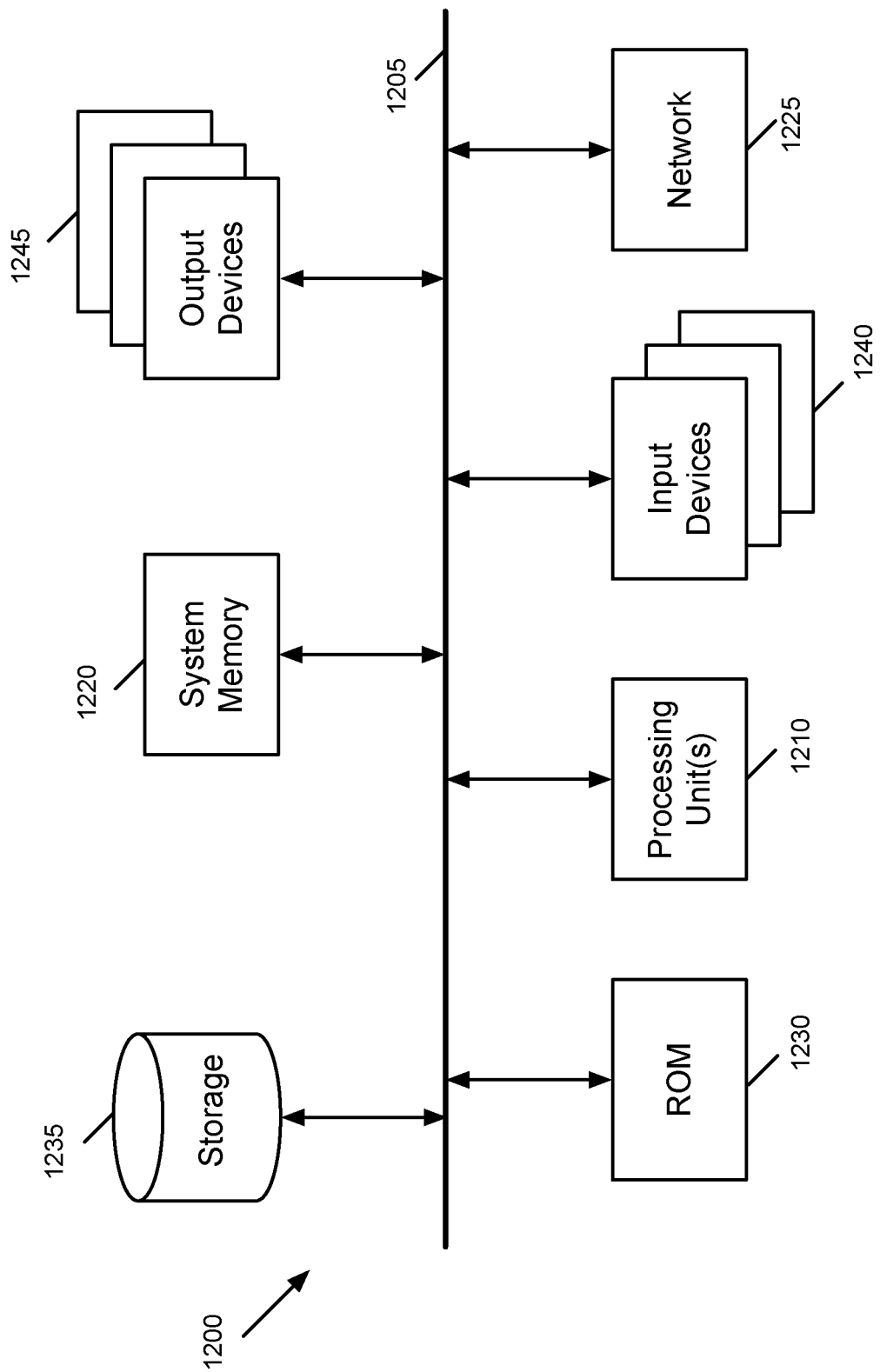
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., desktop computer, personal computer, tablet computer, server computer, mainframe, blade computer, etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1220, a read-only memory (ROM) 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1220, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1220 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), an Intranet, or a network of networks, such as the Internet). Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 1-2, 5, 7-8, and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. A method of identifying security risks in a computer system comprising a plurality of computers executing a plurality of applications, the method comprising:
   receiving event data about threat events associated with a set of applications executing on a set of computers in the computer system;
   for each event, comparing a set of parameters associated with the event with a set of historical parameters maintained for a similar event;
   based on the comparisons, defining a normality characterization for each event to express a probability of occurrence for the event; and based on the normality characterization, defining a prioritized display of security risks due to the threat events associated with the set of application,
wherein defining a prioritized display of security risks due to the threat events associated with the set of application comprises computing a residual risk of loss in the computer system due to the security risks as a function of (i) a risk due to a threat of an exploit of all applications, (ii) a probability of occurrence of a set of credential threat events, and (iii) a probability of occurrence of a set of application threat events.

2. The method of claim 1, wherein defining the normality characterization comprises:
identifying a set of events that occurred over a period of time; and
grouping the identified events as events occurred on a same day and events occurred in a same week.

3. The method of claim 1, wherein defining the normality characterization comprises comparing an event with a set of events occurring at a same source computer in the computer system.

4. The method of claim 1, wherein defining the normality characterization comprises comparing an event with a set of events occurring at a same destination in the computer system.

5. The method of claim 1, wherein defining the normality characterization comprises comparing an event with a set of events of a same type occurring in the computer system.

6. The method of claim 1, wherein defining the normality characterization comprises comparing an event with a set of outbound events to access the Internet from the computer system.

7. The method of claim 1, wherein defining the normality characterization comprises comparing an event with a set of inbound events to access the computer system from the Internet.

8. The method of claim 1, wherein defining the normality characterization comprises determining a protocol used by an event to access the Internet form the computer system.

9. The method of claim 1, wherein defining the normality characterization comprises determining a protocol used by an event to access the computer system from the Internet.

10. The method of claim 1, defining the normality characterization comprises analyzing a plurality of user credential events occurring in the computer system.

11. The method of claim 1 further comprising updating the historical parameters based on the set of parameters associated with each event.

12. The method of claim 1 further comprising, based on the prioritized display of security risks, defining a display of a set of remedies to mitigate one or more security risks.

13. The method of claim 1, further comprising:
directing a set of machine-executable processes to examine an operating environment of the plurality of applications while executing on the plurality of computers; and
storing event data collected by the set of machine-executable processes, wherein receiving event data comprises receiving event data collected and stored by the set of machine-executable processes.

14. The method of claim 1, wherein the credential threat events comprise events caused by unauthorized or unintended activities of users who are granted access to a portion of the computer system and subsequently perform activities that intentionally or unintentionally compromise one or more applications.

15. The method of claim 1, wherein the credential threat events comprise one or more of retrieval of data, modification of data, sending data to entities outside of the computer system, performing financial transactions, and unauthorized or unintended changing of the configuration of an application.

16. The method of claim 1 wherein the application threat events comprise security risks due to threats that use flaws in a configuration of applications, flaws in a configuration of the computer system, and network equipment used to communicate with the applications.

17. The method of claim 16, wherein the flaws in the configuration of the applications comprise a lack of protection mechanisms for accessing the applications.

18. The method of claim 16, wherein the flaws in the configuration of the applications comprise one or more of an out of date version of an application, an out of date operating system running on a computer that is used to execute an application, an unprotected ingress port of a computer where an application runs, a guest account with a default password on a computer, and an out of date encryption on outbound data.

19. A system comprising:
at least one physical processor;
physical memory comprising computer-executable instructions that, when executed by the physical processor, cause the physical processor to:
receive event data about threat events associated with a set of applications executing on a set of computers in the computer system;
for each event, compare a set of parameters associated with the event with a set of historical parameters maintained for a similar event;
based on the comparisons, define a normality characterization for each event to express a probability of occurrence for the event; and
based on the normality characterization, define a prioritized display of security risks due to the threat events associated with the set of application,
wherein defining a prioritized display of security risks due to the threat events associated with the set of application comprises computing a residual risk of loss in the computer system due to the security risks as a function of (i) a risk due to a threat of an exploit of all applications, (ii) a probability of occurrence of a set of credential threat events, and (iii) a probability of occurrence of a set of application threat events.

20. A non-transitory computer-readable medium comprising one or more computer-executable instructions that, when executed by at least one processor of a computing device, cause the computing device to:
receive event data about threat events associated with a set of applications executing on a set of computers in the computer system;
for each event, compare a set of parameters associated with the event with a set of historical parameters maintained for a similar event;
based on the comparisons, define a normality characterization for each event to express a probability of occurrence for the event; and
based on the normality characterization, define a prioritized display of security risks due to the threat events associated with the set of application,
wherein defining a prioritized display of security risks due to the threat events associated with the set of application comprises computing a residual risk of loss in the computer system due to the security risks as a function of (i) a risk due to a threat of an exploit of all applications, (ii) a probability of occurrence of a set of credential threat events, and (iii) a probability of occurrence of a set of application threat events.

* * * * *

UNITED STATES PATENT AND TRADEMARK OFFICE
CERTIFICATE OF CORRECTION

PATENT NO. : 10,691,796 B1
APPLICATION NO. : 15/836796
DATED : June 23, 2020
INVENTOR(S) : Stolte et al.

Page 1 of 1

It is certified that error appears in the above-identified patent and that said Letters Patent is hereby corrected as shown below:

In Column 21, Line 44, Claim 10, delete "1," and insert -- 1, wherein --, therefor.

In Column 22, Line 7, Claim 16, delete "1" and insert -- 1, --, therefor.

Signed and Sealed this
Eleventh Day of August, 2020

Andrei Iancu
*Director of the United States Patent and Trademark Office*